United States Patent
Saito et al.

(10) Patent No.: US 7,273,671 B2
(45) Date of Patent: Sep. 25, 2007

(54) FUEL CELL AND METHOD FOR MAKING THE SAME

(75) Inventors: Yuji Saito, Wako (JP); Jun Sasahara, Wako (JP); Nariaki Kuriyama, Wako (JP); Tadahiro Kubota, Wako (JP); Toshifumi Suzuki, Wako (JP); Yuji Isogai, Wako (JP); Friedrich B. Prinz, Stanford, CA (US); Sang-Joon John Lee, Stanford, CA (US); Suk Won Cha, Stanford, CA (US); Yaocheng Liu, Stanford, CA (US); Ryan O'Hayre, Stanford, CA (US)

(73) Assignees: Honda Giken Kogyo Kabushiki Kaisha, Tokyo (JP); Stanford University, Palo Alto, CA (US)

( * ) Notice: Subject to any disclaimer, the term of this patent is extended or adjusted under 35 U.S.C. 154(b) by 328 days.

(21) Appl. No.: 09/850,203

(22) Filed: May 8, 2001

(65) Prior Publication Data

US 2002/0018924 A1    Feb. 14, 2002

Related U.S. Application Data

(60) Provisional application No. 60/242,136, filed on Oct. 23, 2000, provisional application No. 60/202,827, filed on May 8, 2000.

(51) Int. Cl.
  H01M 8/10    (2006.01)
  H01M 8/22    (2006.01)
(52) U.S. Cl. .............. 429/31; 429/32; 429/40
(58) Field of Classification Search ................. 429/31, 429/32, 38, 39, 40, 34; 502/101; 29/623.1–623.5
See application file for complete search history.

(56) References Cited

U.S. PATENT DOCUMENTS

| 4,499,663 | A | * | 2/1985 | Zwick et al. | 29/623.1 |
| 4,666,798 | A | * | 5/1987 | Herceg | 429/12 |
| 5,085,950 | A | * | 2/1992 | Primdahl | 429/30 |
| 5,209,989 | A | * | 5/1993 | Ishihara et al. | 429/30 |
| 5,273,839 | A | * | 12/1993 | Ishihara et al. | 429/34 |
| 5,525,436 | A | | 6/1996 | Savinell et al. | 429/30 |
| 6,372,375 | B1 | * | 4/2002 | Lawless | 429/40 |
| 6,551,735 | B2 | * | 4/2003 | Badding et al. | 429/31 |
| 6,663,997 | B2 | * | 12/2003 | Dong et al. | 429/39 |

FOREIGN PATENT DOCUMENTS

| EP | 809313 A2 | * | 11/1997 |
| JP | 10-40934 | | 2/1998 |
| JP | 10-189017 | | 7/1998 |

* cited by examiner

*Primary Examiner*—Tracy Dove
(74) *Attorney, Agent, or Firm*—Arent Fox LLP (57) ABSTRACT

In a fuel cell comprising a tubular casing, an electrolyte layer received in the tubular casing, and a pair of gas diffusion electrodes interposing the electrolyte layer and defining a fuel gas passage and an oxidizing gas passage, respectively, each gas diffusion electrode is formed by stacking a plurality of layers of material therefor, for instance in the axial direction of the casing. Because the gas diffusion layers are formed layer by layer, components can be formed in highly fine patterns so that a highly compact tubular fuel cell can be achieved. Similarly, the dimensions of the various elements of the fuel cell can be controlled in a highly accurate manner. Also, the geometric arrangement can be changed at will in intermediate parts of each gas passage.

9 Claims, 6 Drawing Sheets

FUEL CELL AND METHOD FOR MAKING THE SAME

This application claims the benefit of U.S. Provisional Application Nos. 60/202,827, filed May 8, 2000, and 60/242,136, filed Oct. 23, 2000, both of which are herein incorporated by reference.

TECHNICAL FIELD

The present invention relates to a fuel cell comprising a tubular casing, an electrolyte layer received in the tubular casing, and a pair of diffusion electrodes interposing the electrolyte layer and defining a fuel passage and an oxidant passage, and a method for fabricating the same.

BACKGROUND OF THE INVENTION

A fuel cell comprises an electrolyte layer and a pair of electrodes placed on either side of the electrolyte layer, and generates electricity through an electrochemical reaction between fuel gas such as hydrogen and alcohol and oxidizing gas such as oxygen and air, which are supplied to the corresponding electrodes, with the aid of a catalyst. Depending on the electrolytic material used for the electrolyte layer, the fuel cell may be called as the phosphoric acid type, solid polymer type or molten carbonate type.

In particular, the solid polymer electrolyte type fuel cell (SPFC) using an ion-exchange resin membrane for the electrolyte layer is considered to be highly promising because of the possibility of compact design, low operating temperature (100° C. or lower) and high efficiency, as opposed to the solid oxide type fuel cell (SOFC).

There are various geometric arrangements for fuel cells. A planar type comprises a pair of flow distribution plates provided with grooves for defining fuel gas and oxidizing gas passages, and a planar electrolyte layer interposed between the flow distribution plates. A tubular type comprises a tubular casing separated by partition walls into fine passages (so as to form a plurality of cells) or a tubular casing separated by electrolyte layers into fuel gas and oxidizer gas passages.

In a tubular fuel cell, the tubular casing is formed by extrusion as disclosed in Japanese patent laid open publication No. 10-189017 and Japanese patent laid open publication No. 10-40934. By using solid electrolyte, the electrolyte layer can also be formed by extrusion along with the tubular casing. Slurry containing the material for the gas diffusion electrodes and the catalyst is passed through the gas passages or the tubular casing is dipped in a bath containing such slurry so that the slurry be deposited on the surface of the solid electrolytic layer. The slurry is then dried or otherwise cured so as to form the gas diffusion electrodes.

The recent expansion of the applications for fuel cells has given rise to a need for more compact designs, but the extrusion process is not suited for producing compact tubular fuel cells. For instance, it is difficult to evenly deposit the material for the diffusion electrodes on the surface of the solid electrolyte layer by passing slurry through the narrow passages. Variations in the thickness of the diffusion electrodes are detrimental to an efficient power generation.

In a fuel cell, because of the consumption of the fuel gas, the flow rate of fuel gas progressively diminishes along the direction of the gas flow. Therefore, if the cross sectional area of the gas passages is uniform from the upstream end to the downstream end, the flow rate progressively diminishes, and an efficient power generation cannot be attained.

It is conceivable to reduce the cross sectional area of each gas passage from the upstream end to the downstream end, but such an arrangement is quite impossible if the tubular casing is formed by extrusion.

In some applications, because of the special configuration of the space available for installing the fuel cell, it may be desirable to form an L-shaped or U-shaped fuel cell, and to curve the gas passages inside the casing. However, if the tubular casing is formed by extrusion, it is impossible to make the gas passages to curve in intermediate parts thereof.

BRIEF SUMMARY OF THE INVENTION

In view of such problems of the prior art, a primary object of the present invention is to provide a compact tubular fuel cell which is easy to fabricate.

A second object of the present invention is to provide a tubular fuel cell having a high power generating efficiency.

A third object of the present invention is to provide a tubular fuel cell which allows the shape of the gas passages to be selected at will.

A fourth object of the present invention is to provide a tubular fuel cell which can adapt it self for a wide range of applications.

A fifth object of the present invention is to provide a method for fabricating such a tubular fuel cell.

According to the present invention, such objects can be accomplished by providing a fuel cell comprising a tubular casing, an electrolyte layer received in the tubular casing, and a pair of gas diffusion electrodes interposing the electrolyte layer and defining a fuel gas passage and an oxidizing gas passage, respectively, wherein: each gas diffusion electrode is formed by stacking a plurality of layers of material therefor, for instance, in the axial direction of the tubular casing. Electrolyte material may be filled in a gap defined between the gas diffusion electrodes. Thereby, the assembly may be formed into extremely fine patterns so that highly compact tubular fuel cells can be formed. Because the gas diffusion layers are formed layer by layer, the dimensions of the various elements of the fuel cell can be controlled in a highly accurate manner. Also, the geometric arrangement (cross sectional area, axial direction, etc.) can be changed at will in intermediate parts of each gas passage.

BRIEF DESCRIPTION OF THE DRAWINGS

Now the present invention is described in the following with reference to the appended drawings, in which:

FIG. 9(*a*) is a sectional view similar to FIG. 2 showing the structure of a third embodiment of the present invention in the form of a tubular fuel cell; and FIG. 9(*b*) is a sectional view taken along line IXb-IXb of FIG. 9(*a*).

FIG. 9(*c*) is a horizontal sectional view taken along line IXc-IXc of FIG. 9(*a*).

DETAILED DESCRIPTION OF THE PREFERRED EMBODIMENTS

Now the present invention is described in the following in terms of concrete embodiments with reference to the appended drawings.

Figure 1:
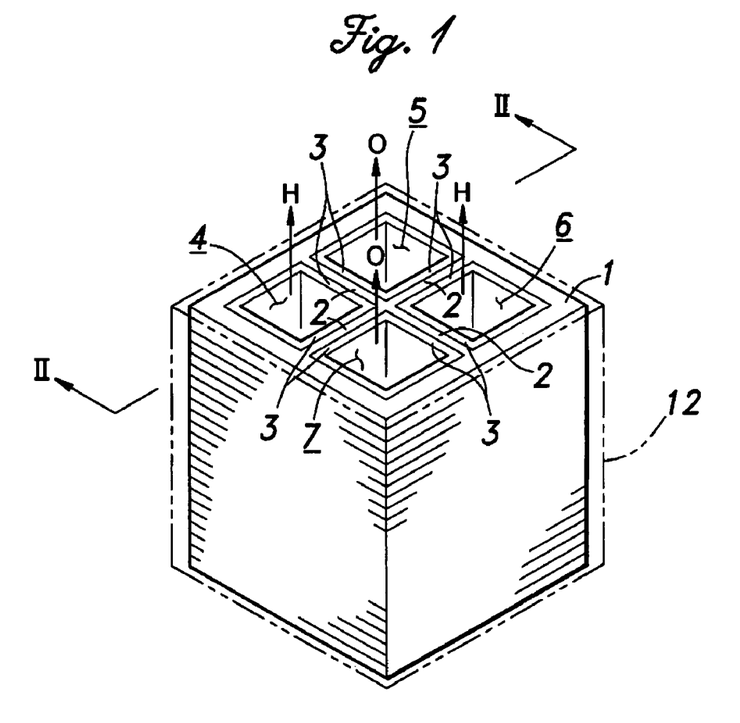
FIG. 1 is a perspective view schematically showing the structure of a first embodiment of the present invention in the form of a tubular fuel cell.
Figure 2:
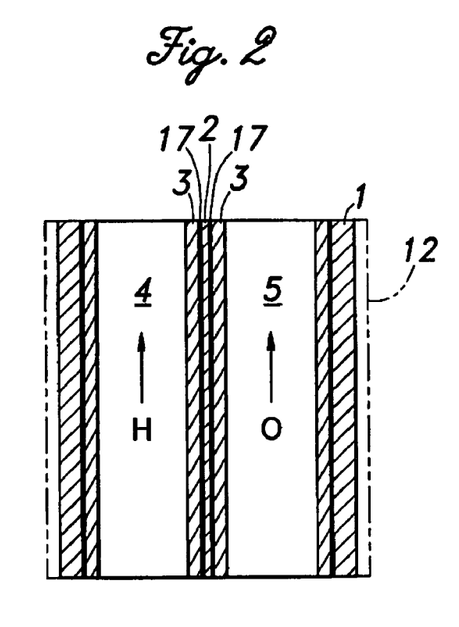
FIG. 2 is a sectional view taken along line II-II of FIG. 1.
Figure 3:
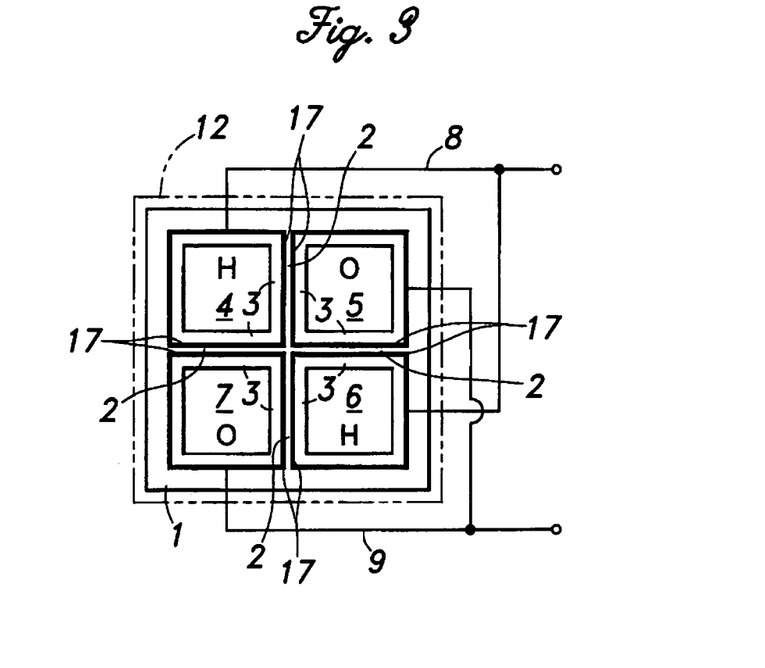
FIG. 3 is a plan view of an end surface of the fuel cell of FIG. 1.
Figure 4A:
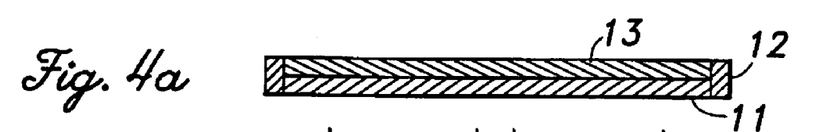
FIGS. 4(a) to 4(i) are sectional views similar to FIG. 2 showing the different fabrication steps of the fuel cell embodying the present invention.
Figure 4B:
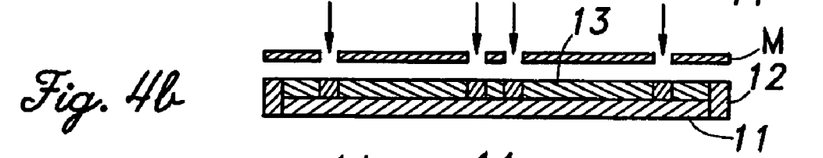
Figure 4C:
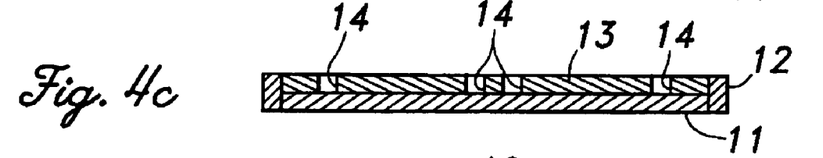
Figure 4D:
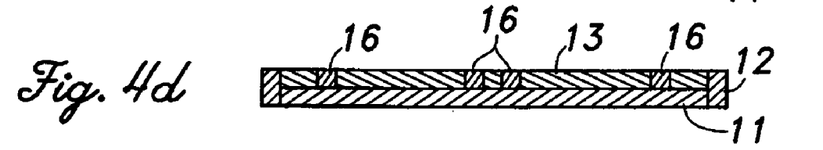
Figure 4E:
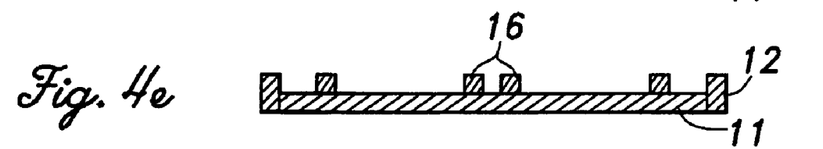
Figure 4F:
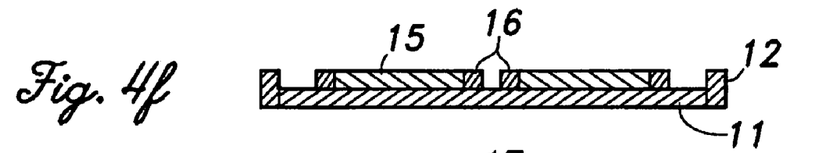
Figure 4G:
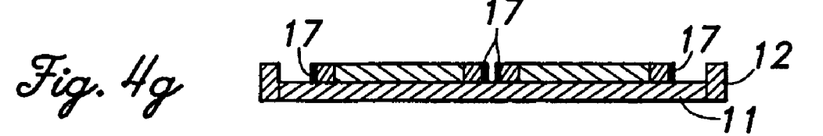
Figure 4H:
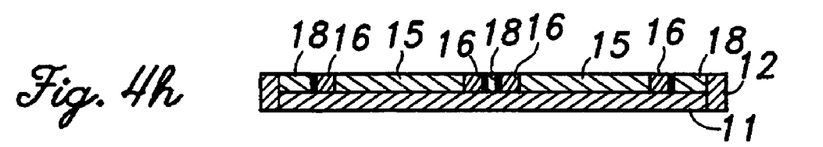
Figure 4I:
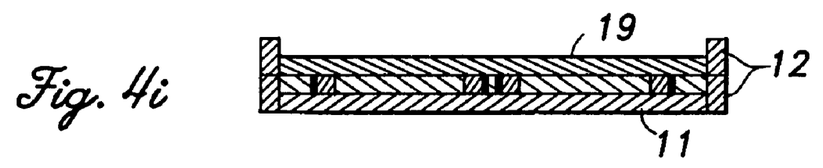

FIG. 1 is a perspective view schematically showing the structure of a first embodiment of the present invention in the form of a tubular fuel cell, and FIGS. 2 and 3 are sectional and plan views of the same. This tubular fuel cell comprises a tubular casing 1, an electrolyte layer 2 formed in the shape of a cross as seen from an axial end so as to define four gas passages 4 to 7, and gas diffusion electrodes 3 formed on either side of the electrolyte layer 2. A diagonally opposing pair of the gas passages 4 and 6 supply one of fuel gas and oxidizer gas, and the remaining pair of the gas passages 5 and 7 supply the other of fuel gas and oxidizer gas. As schematically illustrated only in FIG. 3, at an end of the tubular casing 1, a lead 8 electrically connects the gas diffusion electrodes 3 associated with the passages 4 and 6 to each other, and connects them to an external circuit. Similarly, at the other end of the tubular casing 1, a lead 9 electrically connects the gas diffusion electrodes 3 associated with the passages 5 and 7 to each other, and connects them to an external circuit.

Each of the gas diffusion electrodes 3 is formed in the shape of a rectangular tube along the inner circumferential surface of the corresponding gas passage 4 to 7. The tubular casing 1 is made of the same material as the electrolyte layer 2, and the reason for this is described in connection with the description of the process of fabricating the fuel cell which is to follow.

In practice, a fuel cell assembly is formed by connecting a plurality of such individual fuel cells in series or parallel, and supplying fuel gas such as reformed alcohol gas or pure hydrogen to the gas passages 4 and 6, and oxidizer gas such as air to the gas passages 5 and 7.

Figure 5:
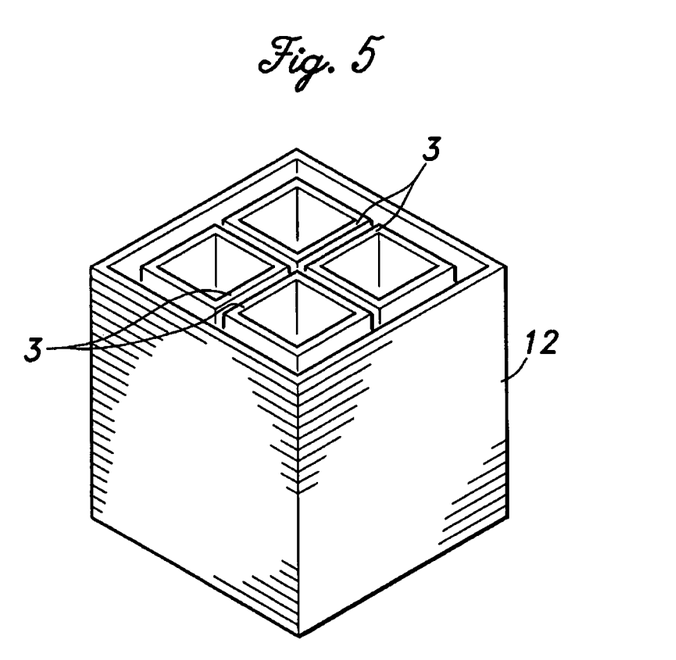
FIG. 5 is a perspective view showing the fabrication process of the fuel cell jointly with FIG. 4.

The process of fabricating the fuel cell described above is now described in the following with reference to FIGS. 4(*a*) to 4(*i*), and FIG. 5.

First of all, as shown in FIG. 4(*a*), a base plate 11 is surrounded by an outer mold frame 12 which may consist of thermosetting resin, and photoresist 13 is applied to the surface of the base plate 11. The photoresist 13 is exposed to light with a mask M defining the shape of the gas diffusion electrodes 3 (four rectangles in this case) in place (FIG. 4(*b*)), and the photoresist 13 is removed in the shape of the gas diffusion electrodes 3 to define recesses 14 (FIG. 4(*c*)). The material for the gas diffusion electrodes 3, such as Ag, Ni and SUS powder which is turned into a gel by using a solvent, is filled into the recesses 14 (FIG. 4(*d*)), and is allowed to solidify by being subjected to heat so as to form hollow rectangular parts 16 that will become the gas diffusion electrodes 3. The term "gel" as used herein could include castable mixtures and solutions. Thereafter, the remaining photoresist 13 is removed (FIG. 4(*e*)).

A temporary layer 15 consisting of water-soluble wax or the like is filled into the interior of each hollow rectangular parts 16 to define the gas passages 4 to 7 (FIG. 4(*f*)), and a catalyst 17 which may consist of Pt is sputtered onto the outer circumferential surface of the parts 16 that will become the gas diffusion electrodes 3 (FIG. 4(*g*)). Then, an additional temporary layer 18 which again may consist of water soluble wax is filled into the gap between the gas diffusion electrodes 3 and the gap between the gas diffusion electrodes 3 and the outer mold frame 12 (FIG. 4(*h*)), and the surface is finished into a planar surface.

Another outer mold frame 12 is placed on the existing outer mold frame 12, and photoresist 19 is applied to the surface of the assembly once again (FIG. 4(*i*)). The parts that will become the gas diffusion electrodes 3 are formed in a similar manner as illustrated in FIG. 4(*b*) to FIG. 4(*h*). Thereafter, the process illustrated in FIG. 4(*b*) to FIG. 4(*h*) is repeated a plurality of times, and the parts that will become the catalyst layer 17 and gas diffusion electrodes 3 are formed as a plurality of layers. Finally, the temporary layer 15 consisting of water soluble wax and filling the parts that will become the gas passages 4 to 7 is removed to leave the four tubular gas diffusion electrodes 3 as shown in FIG. 5.

Figure 6:
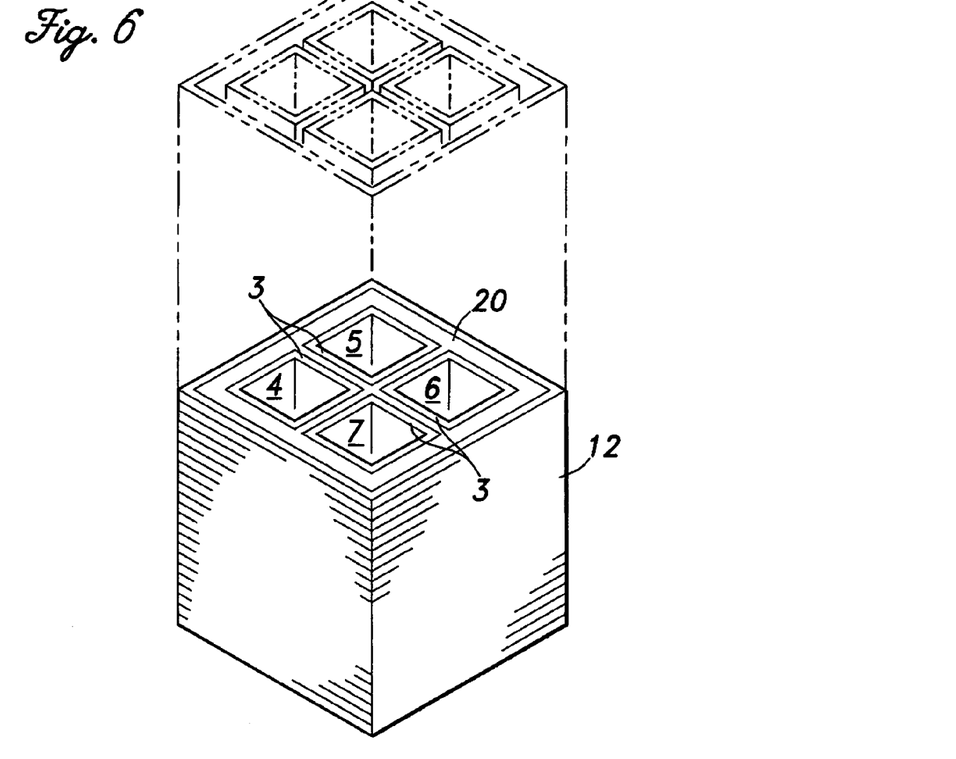
FIG. 6 is a perspective view showing the fabrication process of the fuel cell jointly with FIGS. 4 and 5.

Referring to FIG. 6, gel 20 consisting of high polymer solid electrolytic material is filled into the interior of the outer mold frame 12 excluding the parts that will become the gas passages 4 to 7, and is thermally processed so as to expel the solvent. This yields the electrolyte layer 2 and tubular casing 1 at the same time as shown in FIG. 1. The gel 20 may comprise 20% polybenzimidazole (FBI) and 80% solvent such as dimethylacetoamide (DMAC) as disclosed in U.S. Pat. No. 5,525,436. When the solvent is thermally removed, the electrolyte layer 2 and tubular casing 1 are reduced to one fifth of the original size, as opposed to the gel 20 which remains relatively unchanged in size. Therefore, it is preferable to use a mold which is conformal to the outer mold frame 12 and gas diffusion electrodes 3 but substantially higher than them (as indicated by the imaginary lines in FIG. 6), and fill the gel 20 while applying pressure from above and conducting the thermal process. It is also possible to repeat the step of filling the gel 20 and conducting the thermal process a number of times to build the electrolyte layer 2 and tubular casing 1 for the height of a single outer mold frame 12. Once the fuel cell is built to a prescribed height, the base plate 11 and outer mold frames 12 are removed, and the leads 8 and 9 are attached to complete the fuel cell.

PBI is typically used as structural material, and is used as the material for the tubular casing 1 of this embodiment. In other words, the outer mold frame 12 and gas diffusion electrodes 3 are used as the mold for simultaneously forming the electrolyte layer 2 and tubular casing 1. This reduces the variety of the material, simplifies the structure, and reduces the amount of work required for the fabrication. If desired, the outer mold frame 12 may be left on the completed fuel cell as a protective member. It is also possible to form the tubular casing 1 as a stack of layers by filling material other than the electrolytic material in the gap between the outer mold frame 12 and parts that will become the gas diffusion electrodes 3.

Figure 7:
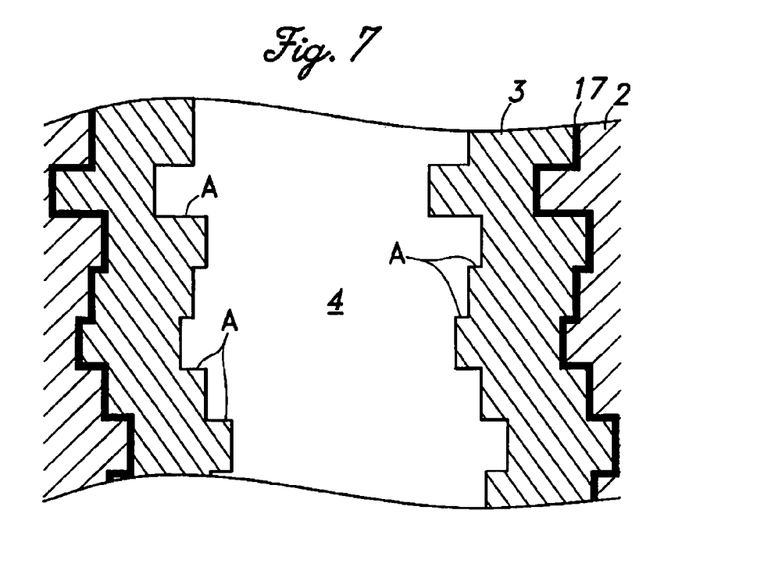
FIG. 7 is an enlarged view of an essential part of FIG. 2.

In the fuel cell fabricated as described above, because of the unavoidable slight mis-registration between the masks for forming different layers, steps A are formed in the gas passages 4 to 7 as shown in FIG. 7 which is an enlarged view of a part of FIG. 2. Such steps A increase the area of contact with the gas, as opposed to the case where the inner surface is highly smooth, and the turbulence that will be produced in the gas flow by these steps A will promote the electrochemical reaction. Such an effect can be enhanced if the steps A are formed intentionally in a pronounced way.

Figure 8A:
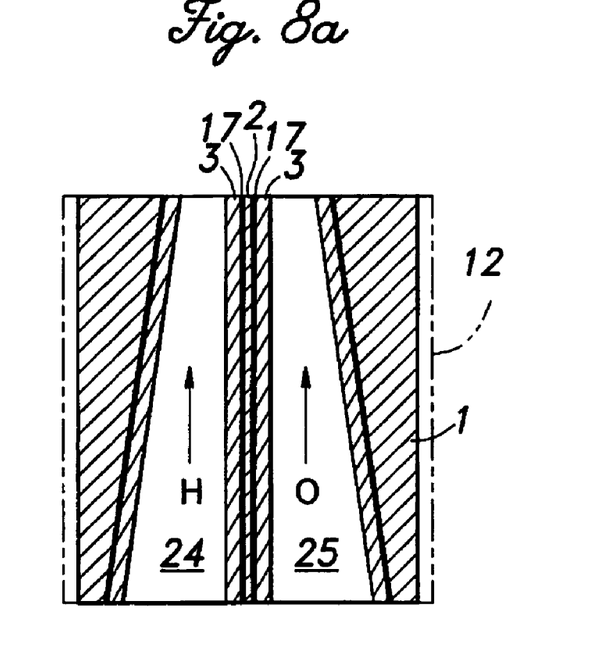
FIG. 8(a) is a sectional view similar to FIG. 2 showing the structure of a second embodiment of the present invention in the form of a tubular fuel cell.
Figure 8B:
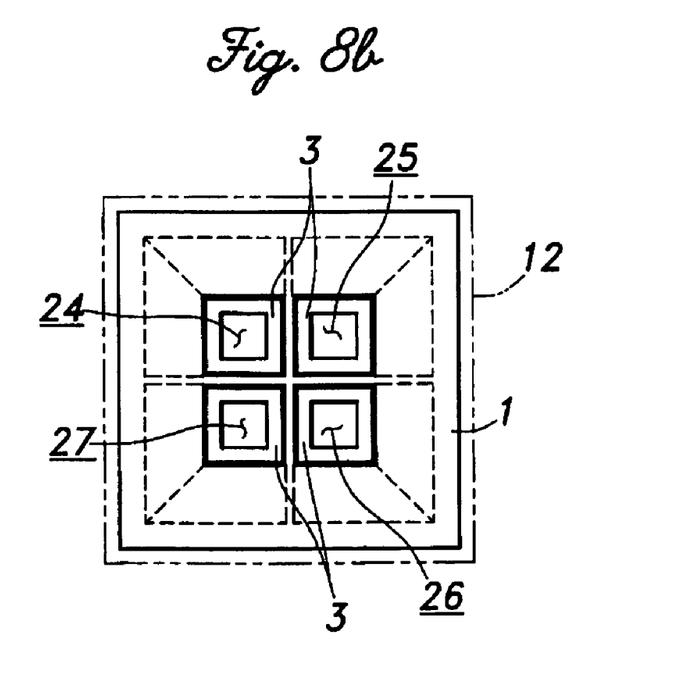
FIG. 8(b) is a plan view similar to FIG. 3 showing the second embodiment of the present invention.

FIG. 8(a) is a sectional view similar to FIG. 2 showing the structure of a second embodiment of the present invention also given as a tubular fuel cell, and FIG. 8(b) is a plan view similar to FIG. 3. In this embodiment, the gas passages 24 to 27 get progressively narrower from the upstream end to the downstream end. This embodiment is otherwise similar to the first embodiment.

In a fuel cell, because the reaction progressively consumes the fuel gas and oxidizer gas, if the gas passages have a constant cross sectional area from the upstream end to the downstream end, the density (pressure) of the gas or the flow rate thereof progressively decreases, and the contact of the gas with the gas diffusion electrode 3 may become so diminished that a desired level of electrochemical reaction may become impossible toward the downstream end. Therefore, by making the gas passages 24 to 27 progressively narrower from the upstream end to the downstream end, the contact between the gas molecules and the gas diffusion electrode 3 can be ensured over the entire length thereof, and electricity can be produced in an efficient manner.

Similarly to the tubular fuel cell of the first embodiment, the tubular fuel cell of the second embodiment is also formed by stacking the parts that will form the catalyst layer 17 and gas diffusion electrodes 3 in layers in the axial direction of the tubular casing 1. By changing the mask M for each cycle or each plurality of cycles of the stacking process, it is possible to form each layer in such a manner that the cross sectional area of each of the gas passages gets progressively narrower from the upstream end to the downstream end.

Figure 9A:
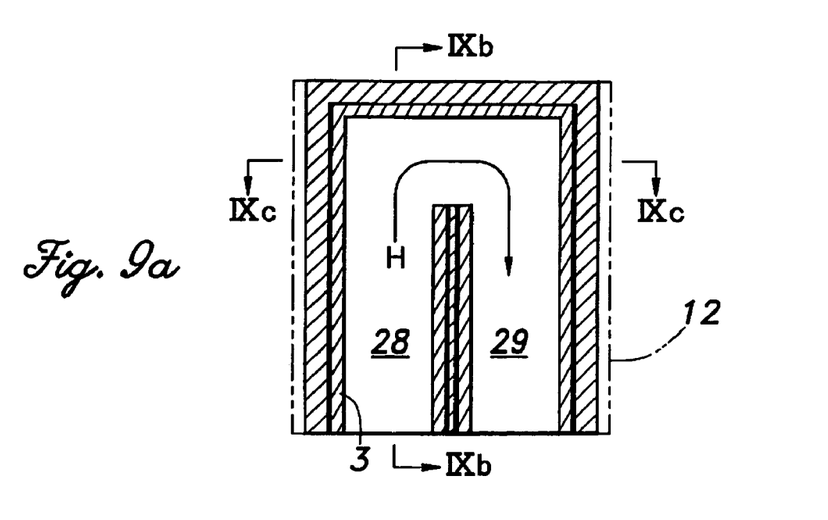
Figure 9B:
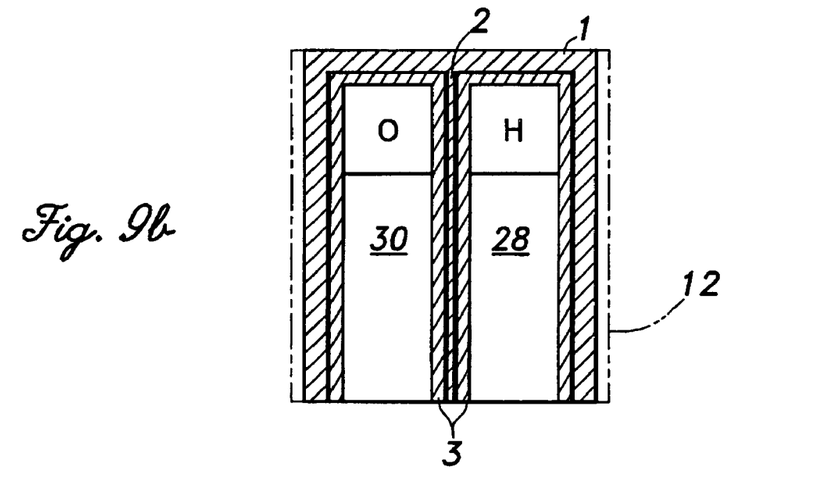
Figure 9C:
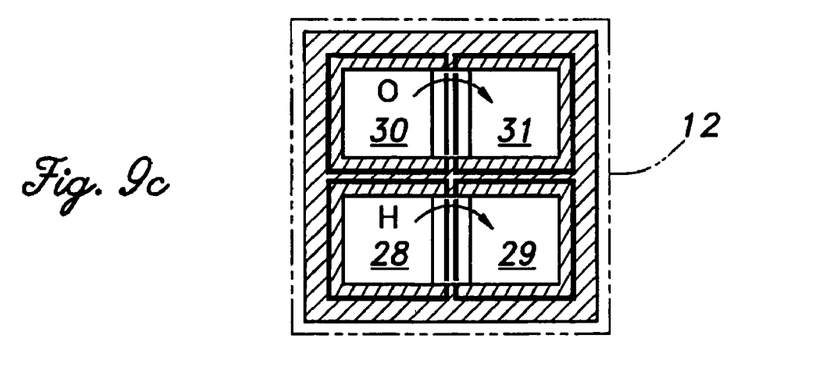

FIG. 9(a) is a sectional view similar to FIG. 2 showing a third embodiment of the present invention given as a tubular fuel cell, FIG. 9(b) is a vertical sectional view of the tubular fuel cell taken along line IXb-IXb of FIG. 9(a), and FIG. 9(c) is a horizontal sectional view of the tubular fuel cell taken along line IXc-IXc of FIG. 9(a). In this embodiment, the tubular casing 1 defines four parallel passages 28 to 31 extending in the axial direction, and the upper end of the casing 1 is closed. The gas passages 28 and 29 are communicated with each other at the closed end so as to jointly form the fuel gas passage, and the passages 30 and 31 are communicated with each other at the closed end so as to jointly form the oxidizing gas passage. In other words, the fuel gas passage 28 and 29 and oxidizer gas passage 30 and 31 are bent in their intermediate parts so as to define U-shaped passages. Therefore, the structure for supplying and recovering the fuel gas and oxidizer gas can be provided on a same end of the casing. This embodiment is otherwise similar to the first embodiment.

Similarly to the tubular fuel cell of the first embodiment, the tubular fuel cell of the third embodiment is also formed by stacking the parts that will form the catalyst layer 17 and gas diffusion electrodes 3 in layers. In particular, by changing the mask M appropriately as the stacking process approaches the closed end of the casing 1, it is possible to form each layer in such a manner that the axial direction of the gas passages 28 to 31 may be bent near the upper end of the assembly as seen in the drawing.

In each of the foregoing embodiments, the material for the gas diffusion electrodes 3 which is prepared by turning the material powder into gel by using a solvent was applied to the recesses, for instance by coating, and was solidified by a thermal process. However, it is also possible to simply coat the material to the recesses and cure it by heat, or use other layer forming processes such as physical vapor deposition, chemical vapor deposition, plating, casting and flame spraying.

As can be appreciated from the foregoing description, the present invention provides a fuel cell comprising a tubular casing, an electrolyte layer received in the tubular casing, and a pair of gas diffusion electrodes interposing the electrolyte layer and defining a fuel gas passage and an oxidizing gas passage, respectively, wherein each gas diffusion electrode is formed by stacking a plurality of layers of material therefor, for instance in the axial direction of the casing. Because the gas diffusion layers are formed layer by layer, various components can be formed in highly fine patterns so that a highly compact tubular fuel cell can be achieved. Similarly, the dimensions of the various elements of the fuel cell can be controlled in a highly accurate manner. Also, the geometric arrangement (cross sectional area, axial direction, etc.) can be changed at will in intermediate parts of each gas passage. The tubular casing can be also formed as a stacked structure, and the need for forming the tubular casing by extrusion can be eliminated, and the registration of the casing with the gas diffusion electrodes is also simplified. If the casing is made of the same material as the electrolyte layer, the fabrication process is even more simplified.

Although the present invention has been described in terms of preferred embodiments thereof, it is obvious to a person skilled in the art that various alterations and modifications are possible without departing from the scope of the present invention which is set forth in the appended claims. For instance, although the fuel and oxidant for the fuel cells are described and claimed as consisting of gases throughout the text of this application, it should be understood that they may also consist of liquid without departing from the scope and spirit of this application.

The invention claimed is:

1. A fuel cell comprising a tubular casing, an electrolyte layer received in said tubular casing, a first gas diffusion electrode completely defining a fuel gas passage and a second gas diffusion electrode completely defining an oxidizing gas passage, wherein said first and second gas diffusion electrodes interpose said electrolyte layer, wherein:

said first and second gas diffusion electrodes each comprise a plurality of layers of material stacked in the axial direction of said tubular casing, wherein said fuel and oxidizing gas passages, which extend in the axial direction, each have a non-uniform diameter and said first gas diffusion electrode extends continuously along said fuel gas passage;

said second gas diffusion electrode extends continuously along said oxidizing gas passage, and wherein said tubular casing comprises high polymer solid electrolytic material surrounding said first and second gas diffusion electrodes, and said electrolyte layer is formed of said high polymer solid electrolytic material; and said fuel cell further comprises a first lead attached to said first gas diffusion electrode at one axial end of said tubular casing such that said first gas diffusion electrode is electrically connected to an external circuit by said first lead and a second lead attached to said second gas diffusion electrode at the other axial end of said tubular casing such that said second gas diffusion electrode is electrically connected to said external circuit by said second lead;

said fuel gas passage and said oxidizing gas passage each having an entrance at a first common plane, wherein said entrance of said fuel gas passage is separate and distinct from said entrance of said oxidizing gas passage; and said fuel gas passage and said oxidizing gas passage each having an exit at a second common plane, wherein said exit of said fuel gas passage is separate and distinct from said exit of said oxidizing gas passage, wherein the first and second common planes extend orthogonally relative to the axial direction of said tubular casing.

2. A fuel cell according to claim 1, wherein said tubular casing also comprises a plurality of layers of material therefore stacked in the axial direction of said tubular casing.

3. A fuel cell according to claim 2, wherein said gas passages are defined by separating an interior of said tubular casing with said electrolyte layer and said gas diffusion electrodes.

4. A fuel cell according to claim 1, wherein neighboring layers of material of said plurality of layers of material are mis-registered relative to each other to form a step in a respective one of said fuel gas passage and said oxidizing gas passage.

5. A fuel cell according to claim 1, wherein at least one of said fuel gas passage and said oxidizing gas passage becomes progressively narrower in a direction from an upstream end toward a downstream end.

6. A fuel cell comprising a tubular casing, an electrolyte layer received in said tubular casing, and a pair of gas diffusion electrodes interposing said electrolyte layer and defining a fuel gas passage and an oxidizing gas passage, respectively, wherein:

each gas diffusion electrode comprises a plurality of layers of material stacked in the axial direction of said tubular casing;

each gas diffusion electrode extends continuously along its associated gas passage;

said tubular casing comprises high polymer solid electrolytic material surrounding said pair of gas diffusion electrodes, and said electrolyte layer is formed of said high polymer solid electrolytic material; and said fuel cell further comprises a first lead attached to one of said gas diffusion electrodes at one axial end of said tubular casing such that said one of said gas diffusion electrodes is electrically connected to an external circuit by said first lead and a second lead attached to the other of said gas diffusion electrodes at the other axial end of said tubular casing such that said other of said gas diffusion electrodes is electrically connected to said external circuit by said second lead;

said fuel gas passage and said oxidizing gas passage each having an entrance at a first common plane, wherein said entrance of said fuel gas passage is separate and distinct from said entrance of said oxidizing gas passage; and said fuel gas passage and said oxidizing gas passage each having an exit at a second common plane, wherein said exit of said fuel gas passage is separate and distinct from said exit of said oxidizing gas passage, wherein the first and second common planes extend orthogonally relative to the axial direction of said tubular casing.

7. The fuel cell according to claim 6, wherein one gas diffusion electrode of the pair of gas diffusion electrodes completely and solely defines the fuel gas passage and the other gas diffusion electrode of the pair of gas diffusion electrodes completely and solely defines the oxidizing gas passage.

8. The fuel cell according to claim 1, wherein said first and second common planes extend across a common surface.

9. The fuel cell according to claim 6, wherein said first and second common planes extend across different surfaces.

* * * * *